US00RE38508E

(19) United States
(12) Reissued Patent
Wright

(10) Patent Number: US RE38,508 E
(45) Date of Reissued Patent: Apr. 27, 2004

(54) STRUCTURAL PANELS WITH METAL FACES AND CORRUGATED PLASTIC CORE

(75) Inventor: John T. Wright, Harleysville, PA (US)

(73) Assignee: Laminators Incorporated, Hatfield, PA (US)

(21) Appl. No.: 09/932,465

(22) Filed: Aug. 20, 2001

Related U.S. Patent Documents

Reissue of:
(64) Patent No.: 6,080,495
Issued: Jun. 27, 2000
Appl. No.: 08/958,340
Filed: Oct. 27, 1997

U.S. Applications:
(60) Provisional application No. 60/051,178, filed on Jun. 28, 1997.

(51) Int. Cl.[7] ..... B32B 3/22; B32B 3/28; B32B 31/12

(52) U.S. Cl. ..... 428/623; 428/626; 428/120; 428/179; 428/182; 428/304.4; 428/319.3; 156/205; 156/210; 156/244.27; 156/272.6

(58) Field of Search ..... 428/72, 182, 186, 428/179, 309.9, 59; 156/205, 210, 244.25, 244.27, 244.11, 272.6, 274.8, 275.7, 292; 52/783.17, 793.1, 794.1, 309.14, 573.1, 783.11

(56) References Cited

U.S. PATENT DOCUMENTS 2,875,117 A 2/1959 Potchen et al.
2,881,304 A 4/1959 Dobson et al.
3,999,928 A 12/1976 Asakura et al.
5,114,510 A 5/1992 Wright
5,316,604 A 5/1994 Fell

*Primary Examiner*—Jeff H. Aftergut
*Assistant Examiner*—Gladys Corcoran
(74) *Attorney, Agent, or Firm*—Burns, Doane, Swecker & Mathis, LLP

(57) ABSTRACT

A structural panel has one or more face sheets bonded by adhesive layers to a core body having two outer plastic liner sheets fusion-bonded to linear ends of inner plastic truss elements spaced apart with open spaces therebetween extending in a plane direction of the plastic liner sheets. The sheet-to-sheet adhesive bonding provides a high-strength laminate bonding that is very resistant to delamination, simple and inexpensive, and can be carried out by a preferred continuous sheet bonding technique. The all-plastic core body is highly resistant to moisture attack, and the open spaces between truss elements provide flexibility to accommodate thermal expansion and contraction. The truss construction of the core body provides high compressive and shear strength, while minimizing the amount of material required to be used. In one preferred embodiment, two metal face sheets are used, and the core body has plastic liner sheets fusion-bonded to a corrugated plastic core sheet. The corrugated plastic core sheet can be formed by a continuous plastic extrusion technique. Diagonal plastic webs or perpendicular plastic I-beams may also be used for the truss elements. Another preferred embodiment has two metal face sheets bonded to two plastic core bodies which in turn are bonded to a center foam core layer. A further embodiment has only one metal face sheet bonded to one side of the plastic core body, allowing it to be used as veneer or curved around rounded structures.

38 Claims, 5 Drawing Sheets

STRUCTURAL PANELS WITH METAL FACES AND CORRUGATED PLASTIC CORE

Matter enclosed in heavy brackets [ ] appears in the original patent but forms no part of this reissue specification; matter printed in italics indicates the additions made by reissue.

This patent application claims the priority of U.S. Provisional Application Ser. No. 60/051,178 filed on Jun. 28, 1997.

FIELD OF THE INVENTION

This invention generally relates to a fabrication method and product of a lightweight structural panel, in particular, a panel that is a laminate of metal face sheets and a plastic core body.

BACKGROUND ART

Lightweight structural panels are used in the construction industry, and are particularly desirable for outdoor use. The ideal panel is lightweight and relatively inexpensive to manufacture, has good insulation value, and is weather resistant. Panels that are durable, weather-resistant, and have high compressive and shear strength are particularly useful for outdoor applications. Structural panels having metal face sheets laminated with a plywood or wood composite core have been used, but are known to have the problem of being vulnerable to damage from moisture which can seep into the core. The moisture can cause the plywood or composite core to swell or rot. It is therefore preferable to replace the plywood or wood composite cores in structural panels for outdoor use.

Structural panels with metal face sheets bonded to a core of foam or a solid polyethylene sheet have also been used. Such a laminate can be formed with good adhesive bonding using an improved sheet bonding process developed by the present inventor and described in U.S. Pat. No. 5,114,510, entitled "Method of Forming a Lightweight Structural Panel", issued on May 19, 1992. While metal-faced panels with foam cores have been used successfully, they have insufficient shear strength for some high-load applications. Also, moisture collected in the foam core that is subjected to cycles of freezing and thawing can damage the panels by causing the layers to delaminate. On the other hand, use of a solid plastic core sheet is costly and wastes material in excess of what is necessary to provide adequate compressive and shear strength.

Honeycomb cores formed with contiguous hexagonal cells laminated between outer face sheets have also been used. However, the fabrication costs of honeycomb cores are relatively high. Therefore, honeycomb-core laminates, for example, as sold by Unida Corp. and Ciba Geigy Corp., are typically used in aircraft and other high-priced constructions, but are too costly for widespread use as construction material. The honeycombs cells are also aligned perpendicular to the face sheets, and thus offer very thin surface areas for bonding to the face sheets. This is a disadvantage since very careful gluing procedures and expensive high-strength adhesives are required. The cells are also closed off by the face sheets, thereby forming trapped air or moisture pockets which can generate expansion pressures from heat or freezing water that can delaminate the face sheets from the cores.

A structural panel formed of plastic face sheets fusion bonded to a corrugated plastic core sheet has also been used, for example, as described in U.S. Pat. Nos. 3,837,973 and 3,999,928 to Asakura et al. However, this type of corrugated all-plastic laminate does not have sufficient rigidity for many construction applications. Another type of structural panel has plastic face sheets bonded to a foam core which can retain its shape despite changes in temperature and humidity, for example, as described in U.S. Pat. No. 4,133,930 of the present inventor. While such plastic foam-core panels are resistant to weathering, they do not have sufficient shear strength for many construction applications.

SUMMARY OF THE INVENTION

Accordingly, it is a principal object of the invention to provide a lightweight structural panel that is resistant to swelling from moisture, weathering, and freezing and thawing cycles, is easy to fabricate and makes optimum use of materials so as to obtain the highest utility for the lowest material and fabrication costs, and at the same time has good rigidity and compressive and shear strength. In particular, it is desired to produce a structural panel that can survive the rigors of outdoor exposure and wide temperature changes, and meet the stress and load requirements for architectural and industrial use.

In accordance with the present invention, a structural panel has at least one face sheet made of a durable material having a high tensile strength, and a core body having two outer plastic liner sheets fusion-bonded to linear ends of inner plastic truss elements spaced apart with open spaces therebetween extending in a plane direction of the plastic liner sheets, wherein one of the outer plastic liner sheets of the core body is bonded with an adhesive layer to an inner surface of the at least one face sheet.

The adhesive bonding of the plastic liner sheets of the core body to the face sheet(s) provides a high-strength laminate bonding that is very resistant to delamination. The use of sheet-to-sheet bonding with an adhesive layer is simple and inexpensive. The all-plastic core body is highly resistant to moisture attack, and the open spaces between truss elements provide flexibility to accommodate thermal expansion and contraction. The use of a core body made of plastic truss elements fusion-bonded to plastic liner sheets provides high compressive and shear strength, while minimizing the amount of material required to be used, thereby keeping the cost low. The fusion-bonding of plastic face sheets and truss elements can be accomplished readily with conventional plastic extrusion techniques.

Metal face sheets are preferred because of their high tensile strength, although plastic and fiber-reinforced skins may also be used for specific applications. A preferred core body has the two plastic liner sheets fusion-bonded to the convex surfaces of a corrugated plastic core sheet formed by a conventional plastic extrusion technique. Use of the corrugated plastic core sheet for the truss elements provides the best combination of high strength, ease of fabrication, and low material cost. However, diagonal plastic webs or perpendicular plastic I-beams may also be used for the truss elements.

In a preferred embodiment, two metal face sheets are bonded adhesively to the outer sides of the plastic core body. In another preferred embodiment, two metal face sheets are bonded to two plastic core bodies which in turn are bonded adhesively to a center foam core layer. Yet another embodiment has one metal face sheet bonded to an outer side of a plastic core body, allowing it to be used as veneer or curved around rounded structures.

Other objects, features and advantages of the present invention are described in detail below in conjunction with the drawings, as follows:

DETAILED DESCRIPTION OF THE INVENTION

Figure 1:
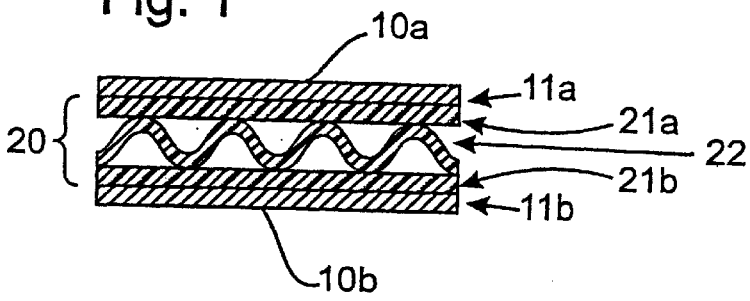
FIG. 1 is a diagram in cross-section of a preferred embodiment of a structural panel in accordance with the invention having two metal face sheets bonded to a corrugated plastic core body.

Referring to FIG. 1, a structural panel in accordance with the present invention has face sheets 10a, 10b bonded by adhesive layers 11a, 11a to the outer surfaces of a core body 20. The core body is formed as a unitary member having plastic liner sheets 21a, 21b fusion-bonded to the ends of spaced-apart truss elements having open spaces therebetween extending in a plane direction of the plastic liner sheets 21a, 21b. In this embodiment, the truss elements are provided by the undulations of a corrugated plastic core sheet 22, and the plastic liner sheets 21a, 21b are fusion-bonded to the linearly-extending convex ridges of the corrugated sheet 22.

The resulting structural panel is durable and lightweight, and obtains maximum utility for a minimum of material used. It has good rigidity, high tensile strength, high compressive and shear strength, and is resistant to swelling from moisture, weathering, and freezing and thawing cycles. It can also be fabricated easily and at a relatively low cost. The double-sided metal-faced panel can be manufactured in thicknesses from 0.125 inch to 0.50 inch, and is especially suitable for use as storefront panels, opaque glazing, curtain walls, in-fill panels, soffits, canopies, signboard, and many other construction applications.

The face sheets 10a, 10b are preferably made of a metal material, such as an aluminum sheet, other metallized sheet, or a metallized layer formed on a suitable substrate. However, fiberglass or structurally hard plastic (ABS) sheets may also be used in certain cases. The metal face sheets are bonded to the plastic core body using an advantageous metal-to-plastic sheet bonding process developed by the present inventor and described in U.S. Pat. No. 5,114,510, entitled "Method of Forming a Lightweight Structural Panel", which is incorporated herein by reference.

In the preferred metal-to-plastic sheet bonding process, the core body (corrugated plastic laminate) has an adhesive layer misted or sprayed on one outer plastic liner sheet. At the same time, a metal face sheet has a lower surface exposed to an electron plasma surface treatment and mated with the adhesive layer on the liner sheet of the core body. The process is repeated on the other side of the core body if two metal face sheets are used.

The electron plasma can be generated by conventional electrical generators operated at radio frequencies, which are used in the industry as corona discharge devices. Oil, rust spots, or films on the surface of the metal sheet are oxidized by the ozone atmosphere created by the electron plasma in the treatment zone, so that the metal surface is changed to free radical condition to accept the adhesive better than a metal surface in a normal oxygen atmosphere would. The electron plasma treatment also renders the metal sheet more malleable, i.e. bendable or ductile, so that it does not crack when worked or shaped into laminate forms. As an alternative to electron plasma surface treatment, the metal surface may be flame treated or wiped with oxidizing chemicals, such as hydrazine, but a less complete effect is obtained as compared to electron plasma surface treatment.

The surface of the plastic core body may also be electron-plasma-treated to remove foreign substances and to form free radicals on the surface. The adhesive material is preferably a reactive polyester epoxy or polyurethane (or any of a number of types of latexes) for greater adhesion to the free radical elements of the treated surfaces. Heat and/or pressure may be applied to the adhesive for spraying or misting. Since epoxy tends to be brittle, a polyurethane adhesive or a modified epoxy (TS) with greater elasticity can be used if the laminate is to be bent or worked.

The above-described metal-to-plastic sheet bonding process produces superior bonding characteristics which reduce the risk of delamination. Laminate panels formed by this process showed no delamination after the equivalent of 10 years of wear. The plastic core body also provides sound deadening or vibration damping, and the metal face sheets can also provide grounding protection.

The preferred core body 20 having plastic liner sheets 21a, 21b fused to the corrugated plastic core sheet 22 can be formed readily and inexpensively by a continuous extrusion process as disclosed in U.S. Pat. Nos. 3,837,973 and 3,999,928 to Asakura et al. In this continuous forming process, a heated thermoplastic synthetic resin core sheet is extruded onto a heated, rotating cylindrical anvil having a wavy (corrugated) surface and is pressed into contact with an extruded plastic liner sheet at an elevated temperature such that the convex surfaces of its undulations become fused to the plastic liner sheet. At a downstream station, another plastic liner sheet is extruded and bonded to the undulations on the other side of the corrugated plastic core sheet to form the unitary, sandwiched laminate used as the preferred core body in the invention.

The corrugated plastic laminate is durable, flexible, and has strong liner-to-core-sheet bonds formed by the fusion bonding. Polytheylene is the preferred plastic material for the corrugated plastic laminate, as it is found to produce a panel with superior characteristics when bonded to metal face sheets. The corrugated polyethylene laminate can be obtained commercially under the tradename Corrugated PolyAllomer (CPA)™, sold by U.S. Corrulite, located in South Bay, Fla.

The corrugated plastic laminate provides a simple and inexpensive truss configuration to the core body. It is well known in engineering that very rigid beam structures can be made with the smallest amount of material by configuring the beam in the shape of a truss. The top and bottom chords of the truss are made from materials with high tensile and compressive properties, while the center of the truss is shaped so that the shear forces caused by deflecting the beam is most advantageously resisted. This is accomplished by arranging truss shear members as diagonal elements extending between the top and bottom chords of the beam. A lot of open air space (light weight) results from this type of construction. This open space is advantageous for several reasons. It is less expensive to use small discrete shear elements than to fill the whole space with structural material. The resulting beam has exceptional stiffness and load-bearing utility, while being lighter in weight and lower in cost. These same features are utilized in the panel construction of the present invention.

Figure 2A:
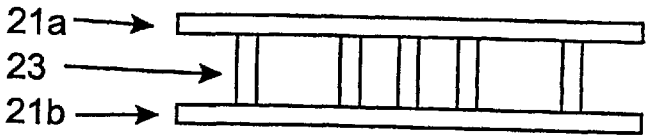
FIG. 2A is a diagram in cross-section showing another embodiment of a core body for the structural panel having I-beams for truss elements.
Figure 2B:
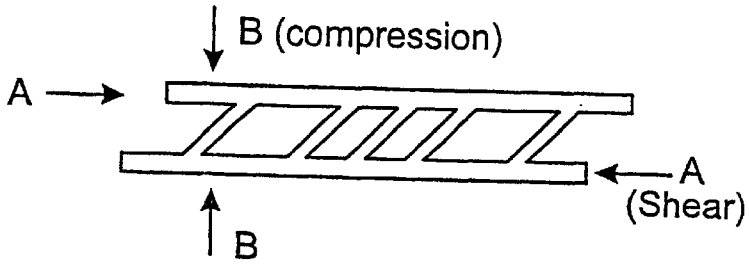
FIG. 2B illustrates collapsing forces on the core body.
Figure 2C:
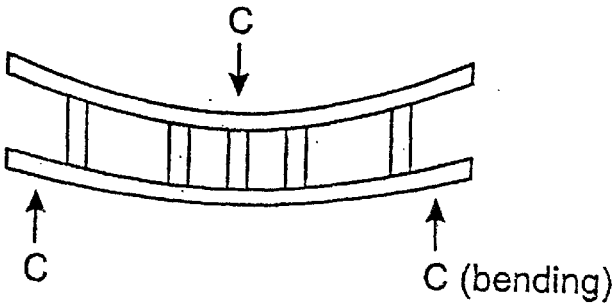
FIG. 2C illustrates bending forces on the core body.

Other types of truss elements may be used in accordance with the disclosed principles of the invention. For example, as shown in FIG. 2A, the truss elements may take the form of vertical I-beams 23 extending between the outer liner sheets 21a, 21b. However, as indicated in FIG. 2B, this configuration is less desirable for applications where a high compressive loading is expected, because a combination of shear forces A and compression forces B can cause the I-beams to collapse sideways. Also, as shown in FIG. 2C, unbalanced compression forces C on the core body can cause shear and compression of the I-beams that results in a large amount of bending of the panel. These problems can be offset by using thicker I-beams and/or spacing them more closely together.

Figure 3:
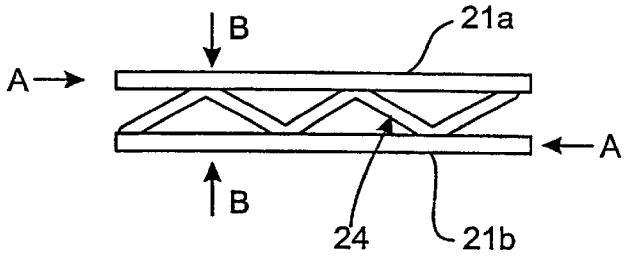
FIG. 3 is a diagram in cross-section showing another embodiment of a core body for the structural panel having diagonal webs for truss elements.

Another embodiment of a core body for use in the invention is shown in FIG. 3A having diagonal webs 24 as the truss elements between the plastic liner sheets 21a, 21b. The diagonal webs can be formed as a continuous core sheet, for example, by molding the plastic zig-zag form then fusing the liner sheets to the upper and lower ridges joining the diagonal webs. This type of construction would strongly resist shear forces A and compression forces B, and therefore would resist collapsing and bending better than the I-beam type construction.

The use of spaced-apart truss elements in the core body also allows the structural panel of the present invention to resist weathering. These structural panels used outdoors must be able to withstand the ravages of severe climate, particularly water soaking, water-borne biological and chemical attack, and water's physical stresses from thermal expansion and freeze/thaw cycling. Panel manufacturers which have used metal corrugated core sheets bonded adhesively to metal face sheets have found that when the panels become soaked with water and then frozen, the expansion forces of water freezing on the rigid metal cells can cause shear forces on the bonding with the face sheets, and cause the panels to delaminate.

Figure 4A:
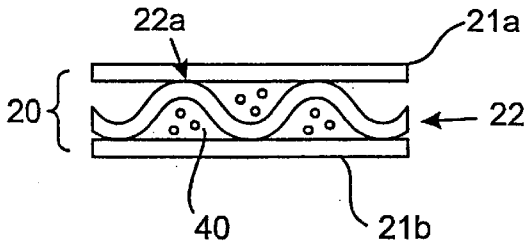
FIGS. 4A and 4B illustrate how the corrugated plastic core body in the structural panel of FIG. 1 can accommodate expansion forces from water freezing.
Figure 4B:
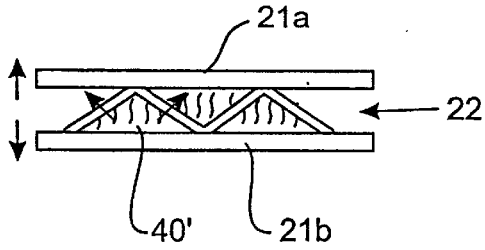

As illustrated in FIG. 4A, the corrugated core sheet 22 of the preferred core body 20 has convex surfaces 22a formed by its undulating shape. If the panel becomes soaked with water, water 40 can become collected in the open spaces between the undulations. In FIG. 4B, the water when frozen can exert expansion forces in the perpendicular direction against the bonds with the liner sheets 21a, 21b, as well as against the corrugated webs of the core sheet 22 in between. The curvature of the convex surfaces 22a where the corrugated core sheet is bonded to the liner sheets plays a critical part in resisting these forces. As the freezing water exert forces to push the liner sheets apart, the slack in the web curvatures is taken up by straighening under expansion pressure, thereby allowing the liner sheets to separate slightly in the perpendicular direction, as well as some deflection on the webs in between. Thus, the web curvatures allows flexibility perpendicular to the liner sheets while maintaining shear rigidity parallel to the plane of the liner sheets.

Structural panels are also required to have thermal resistance in outdoor wall construction. By using a different and non-conductive (plastic) material for the core body, the panel of the invention offers high resistance to the flow of heat or cold through the panel. Tests have indicated that over a typical 5-year life cycle for outdoor wall construction, the savings in energy in heating or cooling can equal or exceed the material and installation costs of the panels. The thermal properties of the panels also lead to improved moisture control in building panel walls, because there is a lower tendency for condensation to occur and cause damage to the panels.

Figure 5:
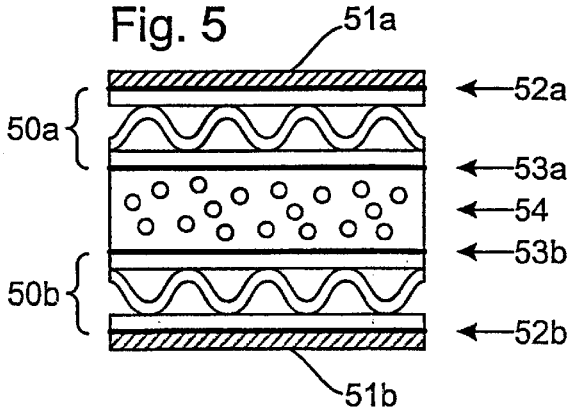
FIG. 5 is a diagram in cross-section of another preferred embodiment of the invention having double metal face sheets bonded to two plastic core bodies and a center foam core layer.

In FIG. 5, another preferred embodiment of the invention has two metal face sheets 51a, 51b bonded by adhesive layers 52a, 52b to outer surfaces of two plastic core bodies 50a, 50b, which in turn have their inner surfaces bonded by adhesive layers 53a, 53b to the surfaces of a center foam core layer 54. This double-layered foam-core panel is manufactured with a thicknesses of about 1.0 inch, and has a high rigidity, shear strength, and insulation value for building wall construction.

Figure 6:
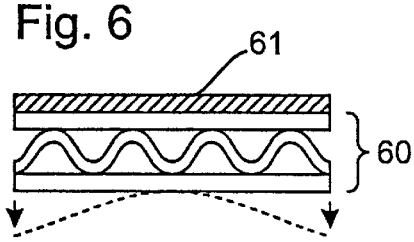
FIG. 6 is a diagram in cross-section of another preferred embodiment of the invention having one metal face sheet bonded to one side of a plastic core body for use as veneer or covering rounded structures.

In FIG. 6, yet another embodiment is shown having one metal face sheet 61 bonded adhesively to an outer surface of a plastic core body 60 on only one side. This single-faced panel can be used in veneer applications. The inner surface of the plastic core body can be curved around rounded structures, such as for covering columns or rounded walls.

The panels of the invention are superior to conventional structural panels in its combined properties of resistance to weathering, high strength, and low cost. Conventional structural panels having plywood cores absorb water too readily, have a lower quality of material, and are becoming more expensive every year due to a dwindling natural resource of old growth trees. Plywood suffers from natural defects such as knots, splits and biological deterioration. They must be meticulously installed with caulking sealers to prevent water and moisture from collecting in the cores. When moisture builds up in the cores from seal leakage, the panels fail by corrosion, rotting, and eventual consumption by natural degradation. The panels in the present invention resist all of these attacks, and the adhesive bonding and metal preparation treatment also precludes damage by corrosion from anaerobic pitting which is a common problem with wood-core panels.

In comparison to panels using a solid polyethylene core sheet, the panels of the invention offer the required compressive and shear strength for their intended usage, but does waste excessive material in a solid core. They obtain maximum effect from "section depth", which refers to the efficiency with which the materials are spaced to perform a bending resistance function. In an I-beam core structure, for example, 80% of the material is used in the flanges while 20% is used in the webs. This maximizes the spread-out of material, resulting in the highest utility for the lowest cost.

Conventional panels using metal honeycomb cores or metal corrugated sheet are too brittle, have a higher weight, offer very low thermal resistance, and do not improve the energy efficiency value of a building wall. They are also affected by water and expansion by heat or freezing water. They will also weaken under attack of moisture or moisture-borne chemicals. Even if honeycomb cores are made of polyethylene material, their cost remains too high for construction panel applications. Paper honeycombs absorb water too readily, and will soften and delaminate if not resin saturated and heat cured. Due to their narrow bonding area and perpendicular alignment of the cells, honeycomb cores are also susceptible to thermal and freezing water expansion pressures that can cause delamination.

Figure 7:
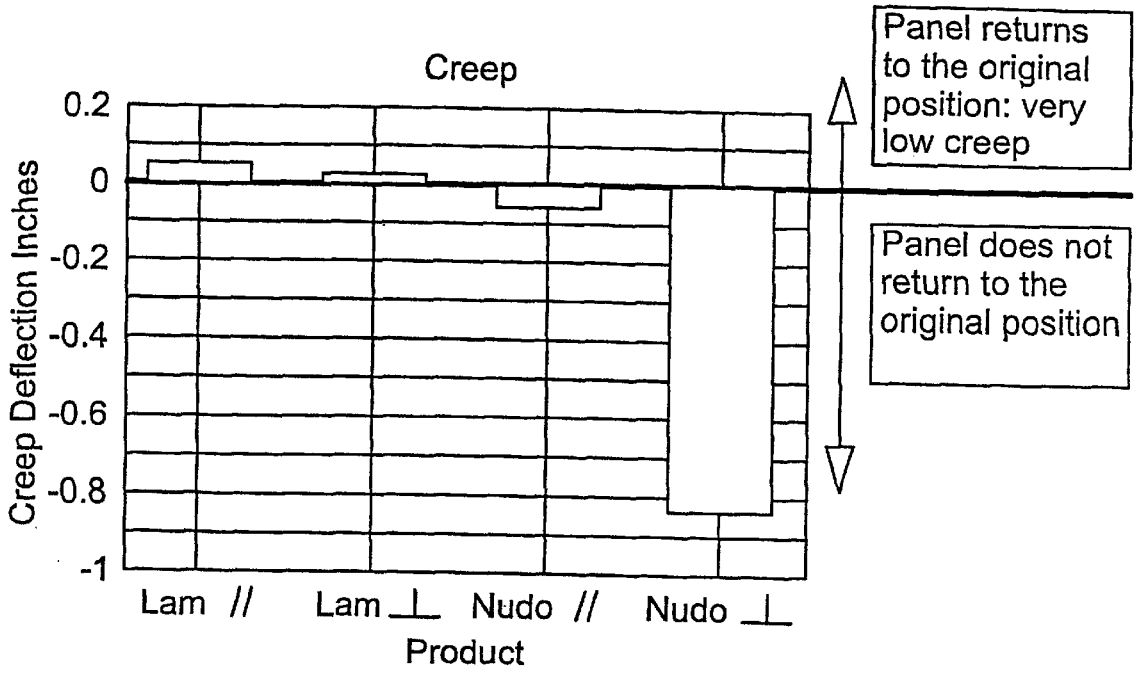
FIG. 7 is a chart comparing creep (glue line slippage) of the panel of the invention to a conventional honeycomb core panel.
Figure 8:
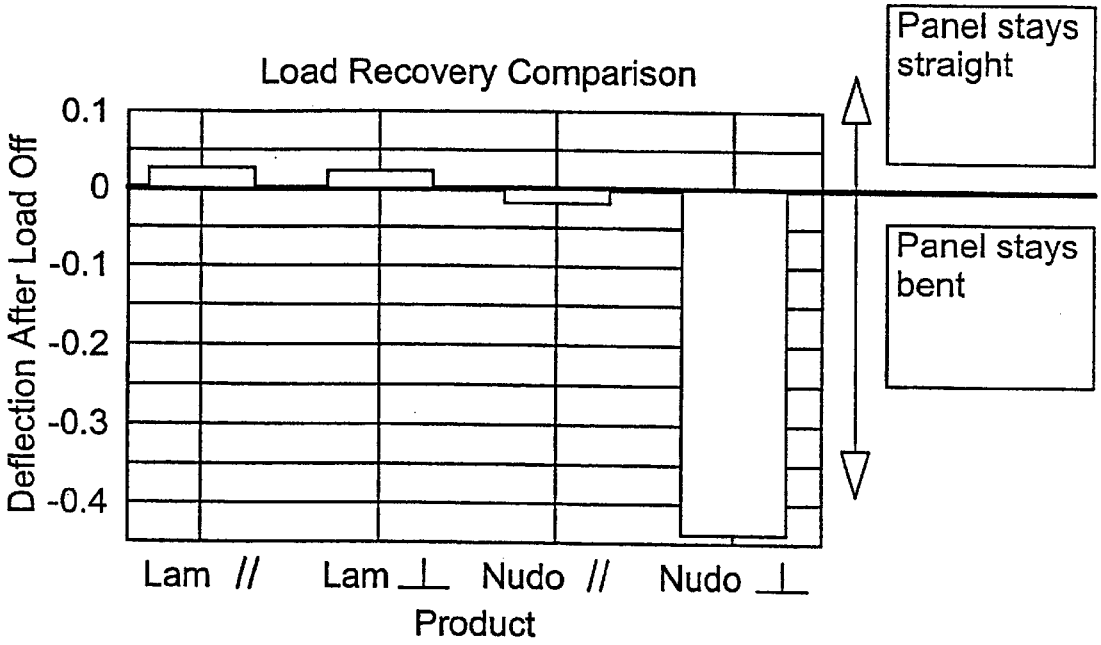
FIG. 8 is a chart comparing load recovery of the panel of the invention to a conventional honeycomb core panel.
Figure 9:
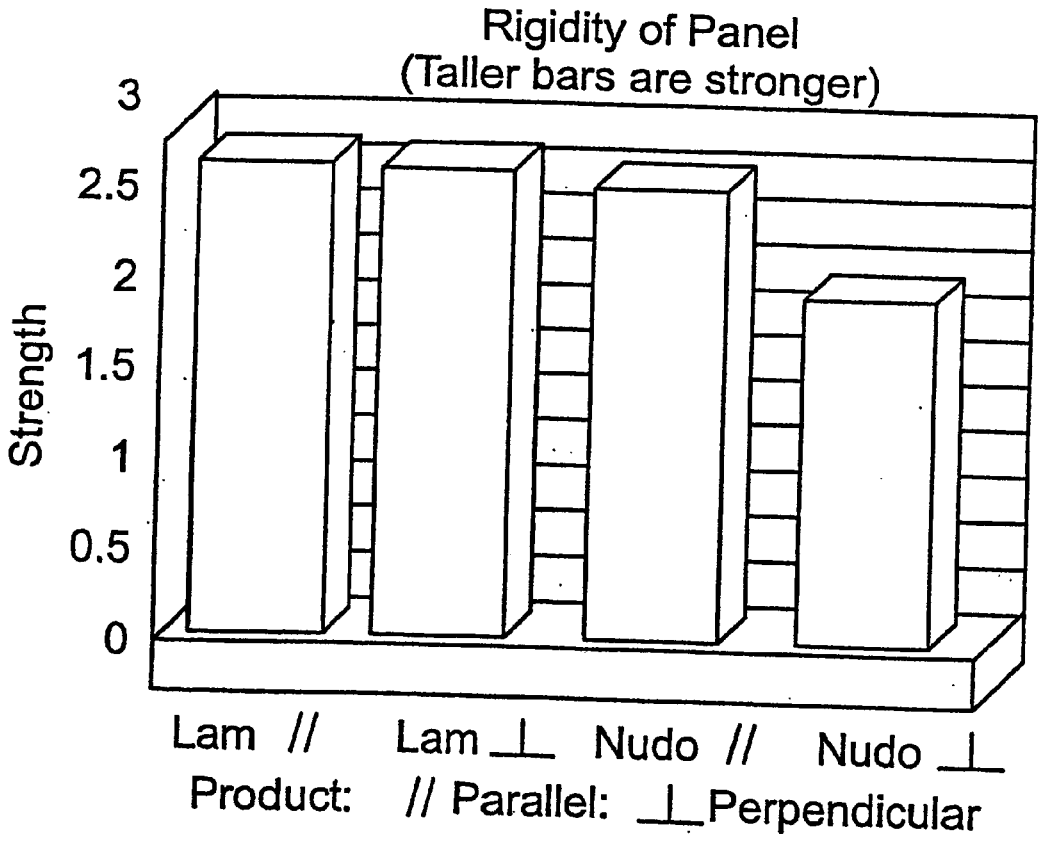
FIG. 9 is a chart comparing rigidity of the panel of the invention to a conventional honeycomb core panel.

In FIGS. 7, 8 and 9, test results are shown comparing certain properties of the metal-faced corrugated plastic core laminate ("Lam") of the present invention to a metal-faced honeycomb core panel ("Nudo") in conventional use. In FIG. 7, "Creep" in the parallel direction (||) and perpendicular direction (⊥) is a measure of the slippage of the glue line of the panel. Negative creep numbers (below the "0" line) indicate deflections resulting in permanently bent or deformed panels. In FIG. 8, "Load Recovery" is a measure of the panel's ability to return to its original position after loading in the parallel direction (||) and perpendicular direction (⊥). A large negative number indicates a deflection resulting in the panel being permanently deformed by the load. In FIG. 9, "Rigidity" is a measure of bending strength in the parallel direction (||) and perpendicular direction (⊥). A panel of stronger rigidity would resist bending better, for example, under wind and snow loads. The comparative tests show that the panel of the invention is stronger in all properties measured than the conventional honeycomb core panel.

In the panels of the present invention, the sheet-to-sheet adhesive bonding between face sheets and surfaces of the core body allows the adhesive to be spread out over broad areas, which eliminates problems in gluing, lowers the cost in processing, and allows the use of lower cost adhesives. The panels can be controlled in component thickness, to lower the cost and balance the shear and compression strengths of the panel to the best benefit of the intended end use. The liner sheets of the core body are primarily used to carry the glue layers and isolate the metal faces from the open cores, therefore the metal faces can be made very thin. The corrugations or other truss elements carry the shear load of the panels under bending forces, and support the faces in tension and compression. Proportionately more material may be used for the truss elements than the liner sheets, thus allowing the overall core body to be made lighter in weight and lower in coast than other core materials.

Although the invention has been described with reference to certain preferred embodiments, it will be appreciated that many other variations and modifications thereof may be devised in accordance with the principles disclosed herein. The invention, including the described embodiments and all such variations and modifications within the scope and spirit of the invention, is defined in the following claims.

I claim:

1. A structural panel comprising:

at least one metal face sheet made of a durable metallic material having a high tensile strength, and a core body having two outer plastic liner sheets fusion-bonded to linear ends of inner plastic truss elements spaced apart with open spaces there between extending in a plane direction of the plastic liner sheets, wherein one of the outer plastic liner sheets of the core body is bonded with an adhesive layer to an inner surface of the at least one face sheet in which the inner surface of the metal face sheet and the surface of the outer plastic liner sheet are treated with an electron plasma surface treatment to remove foreign substances therefrom and the treated surface of the metal face sheet and of the outer plastic liner sheet are bonded together with an adhesive layer said bonding with the adhesive layer providing a high strength bonding characteristic to the structural panel with low risk of delamination in use.

2. A structural panel according to claim 1, wherein the core body comprises two plastic liner sheets fusion-bonded to convex surfaces of undulations of a corrugated plastic core sheet.

3. A structural panel according to claim 2, wherein the two plastic liner sheets and corrugated plastic core sheet of the core body are made of polyethylene.

4. A structural panel according to claim 1, wherein the core body comprises two plastic liner sheets fusion-bonded to linear ends of a plurality of plastic I-beams spaced apart and extending perpendicularly between the liner sheets.

5. A structural panel according to claim 1, wherein the core body comprises two plastic liner sheets fusion-bonded to linear web segments extending diagonally between the liner sheets.

6. A structural panel according to claim 1, wherein two metal face sheets are bonded by adhesive layers to respective plastic liner sheets of the plastic core body.

7. A structural panel according to claim 1, wherein two metal face sheets are bonded by adhesive layers to two plastic core bodies which in turn are bonded by adhesive layers to a center foam core layer.

8. A structural panel according to claim 1, wherein the adhesive layers is made of a material selected from a group comprising a polyethylene epoxy, polyethylene adhesive, and a latex adhesive.

9. A method of forming a structural panel comprising the steps of: providing at least one metal face sheet made of a durable metallic material having a high tensile strength, and a core body having two outer plastic liner sheets fusion-bonded to linear ends of inner plastic truss elements spaced apart with open spaces there between extending in a plane direction of the plastic liner sheets, and bonding one of the outer plastic liner sheets of the core body with an adhesive layer to an inner surface of the at least one face sheet in which the inner surface of the metal face sheet and the surface of the outer plastic liner sheet are treated with an electron plasma surface treatment to remove foreign substances therefrom and the treated surface of the metal face sheet and of the outer plastic liner sheet are bonded together with an adhesive layer, such that said bonding with the adhesive layer provides a high-strength bonding characteristic to the structural panel with low risk of delamination in use.

10. A method of forming a structural panel according to claim 9, wherein the core body comprises two plastic liner sheets fusion-bonded to convex surfaces of undulations of a corrugated plastic core sheet.

11. A method of forming a structural panel according to claim 10, wherein the core body is formed by extruding a heated thermoplastic synthetic resin core sheet onto a heated, rotating cylindrical anvil having a wavy (corrugated) surface, pressing the extruded, corrugated core sheet thus formed into contact with an extruded plastic liner sheet at an elevated temperature such that convex surfaces of its undulations become fused to the plastic liner sheet, and extruding another plastic liner sheet and pressing it into contact at an elevated temperature with the convex surfaces of the undulations of the corrugated core sheet so that it becomes fused thereto, thereby forming a unitary, sandwiched laminate as the core body.

12. A method of forming a structural panel according to claim 10, wherein the two plastic liner sheets and corrugated plastic core sheet of the core body are made of polyethylene.

13. A method of forming a structural panel according to claim 9, wherein the core body comprises two plastic liner sheets fusion-bonded to linear ends of a plurality of plastic I-beams spaced apart and extending perpendicularly between the liner sheets.

14. A method of forming a structural panel according to claim 9, wherein the core body comprises two plastic liner sheets fusion-bonded to linear web segments extending diagonally between the liner sheets.

15. A method of forming a structural panel according to claim 9, wherein the step of bonding one of the outer plastic liner sheets of the core body to the face sheet is carried out by using a metal face sheet, applying the adhesive layer on the plastic liner sheet, exposing the inner surface of the metal face sheet to said electron plasma surface treatment, and mating the treated inner surface of the metal face sheet to the adhesive layer on the plastic liner sheet of the core body.

16. A method of forming a structural panel according to claim 15, wherein the plastic liner sheet is exposed to said electron plasma surface treatment before applying the adhesive layer thereon.

17. A method of forming a structural panel according to claim 16, wherein the adhesive layer is made of a material selected from a group comprising a polyester epoxy, a polyurethane adhesive, and a latex adhesive.

*18. A structural panel comprising:*

*at least one metal face sheet made of a durable metallic material having a high tensile strength, and*

*a unitary core body having two outer plastic liner sheets and inner plastic truss elements spaced apart with open spaces there between extending in a plane direction of the plastic liner sheets,*

*wherein a surface of one of the outer plastic liner sheets of the core body is bonded with an adhesive layer to an inner surface of the at least one metal face sheet, said inner surface of the at least one metal face sheet or said surface of the outer plastic liner sheet being treated with an electron plasma surface treatment to remove foreign substances therefrom, with said surface of the outer plastic liner sheet being bonded by the adhesive layer to said inner surface of the at least one metal face sheet, said bonding with the adhesive layer providing a high strength bonding characteristic to the structural panel with low risk of delamination in use.*

*19. A structural panel according to claim 18, wherein the inner plastic truss elements are formed by a corrugated plastic core sheet having undulations, the two plastic liner sheets being fusion-bonded to convex surfaces of the undulations of the corrugated plastic core sheet.*

*20. A structural panel according to claim 19, wherein the two plastic liner sheets and corrugated plastic core sheet of the core body are made of polyethylene.*

*21. A structural panel according to claim 18, wherein the inner plastic truss elements are formed by a plurality of plastic I-beams spaced apart and extending perpendicularly between the liner sheets, the two plastic liner sheets being fusion-bonded to linear ends of the plastic I-beams.*

*22. A structural panel according to claim 18, wherein the truss elements are formed by linear web segments extending diagonally between the liner sheets, the two plastic liner sheets being fusion-bonded to the linear web segments.*

*23. A structural panel according to claim 18, wherein two metal face sheets are bonded by adhesive layers to respective plastic liner sheets of the plastic core body.*

*24. A structural panel according to claim 18, wherein two metal face sheets are bonded by adhesive layers to two plastic core bodies which in turn are bonded by adhesive layers to a center foam core layer.*

*25. A structural panel according to claim 18, wherein both said inner surface of the metal face sheet and said surface of the outer plastic liner sheet are treated with the electron plasma surface treatment to remove foreign substances.*

*26. A structural panel according to claim 18, wherein said inner surface of the metal face sheet is treated with the electron plasma surface treatment to remove foreign substances.*

*27. A structural panel according to claim 18, wherein said surface of the outer plastic liner sheet is treated with the electron plasma surface treatment to remove foreign substances.*

*28. A structural panel according to claim 18, wherein the core body is formed by an extrusion process.*

*29. A method of forming a structural panel comprising:*

*providing at least one metal face sheet made of a durable metallic material having a high tensile strength, and a unitary core body having two outer plastic liner sheets and inner plastic truss elements spaced apart with open spaces there between extending in a plane direction of the plastic liner sheets, and*

*bonding a surface of one of the outer plastic liner sheets of the core body with an adhesive layer to an inner surface of the at least one metal face sheet, with either said inner surface of the at least one metal face sheet or said surface of the outer plastic liner sheet being treated with an electron plasma surface treatment to remove foreign substances therefrom, said inner surface of the at least one metal face sheet being bonded with the adhesive layer to said surface of the outer plastic liner sheet, such that said bonding with the adhesive layer provides a high-strength bonding characteristic to the structural panel with low risk of delamination in use.*

*30. A method of forming a structural panel according to claim 29, wherein the truss elements are formed by a corrugated plastic core sheet having undulations, the two plastic liner sheets being fusion-bonded to convex surfaces of the undulations of the corrugated plastic core sheet.*

*31. A method of forming a structural panel according to claim 30, wherein the core body is formed by extruding a heated thermoplastic synthetic resin core sheet onto a heated, rotating cylindrical anvil having a corrugated surface to form a corrugated core sheet having undulations, pressing the extruded, corrugated core sheet thus formed into contact with an extruded plastic liner sheet at an elevated temperature such that convex surfaces of the undulations become fused to the plastic liner sheet, and extruding another plastic liner sheet and pressing it into contact at an elevated temperature with the convex surfaces of the undulations of the corrugated core sheet so that the another plastic liner sheet becomes fused thereto, thereby forming a unitary, sandwiched laminate as the core body.*

*32. A method of forming a structural panel according to claim 31, wherein the two plastic liner sheets and corrugated plastic core sheet of the core body are made of polyethylene.*

*33. A method of forming a structural panel according to claim 29, wherein the inner plastic truss elements are formed by a plurality of plastic I-beams spaced apart and extending perpendicularly between the liner sheets, the two*

*plastic liner sheets being fusion-bonded to linear ends of the plastic I-beams.*

*34. A method of forming a structural panel according to claim 30, wherein the truss elements are formed by linear web segments extending diagonally between the liner sheets, the two plastic liner sheets being fusion-bonded to the linear web segments.*

*35. A method of forming a structural panel according to claim 29, wherein the adhesive layer is applied on said surface of the plastic liner sheet and said inner surface of the metal face sheet is treated with said electron plasma surface treatment, and including mating the treated inner surface of the metal face sheet to the adhesive layer on the plastic liner sheet of the core body.*

*36. A method of forming a structural panel according to claim 35, wherein said surface of the plastic liner sheet is also treated with electron plasma surface treatment before applying the adhesive layer thereon.*

*37. A method of forming a structural panel according to claim 29, wherein said inner surface of the metal face sheet is treated with the electron plasma surface treatment to remove foreign substances.*

*38. A method of forming a structural panel according to claim 29, wherein said surface of the outer plastic liner sheet is treated with the electron plasma surface treatment to remove foreign substances.*

* * * * *